(12) United States Patent
Lee et al.

(10) Patent No.: US 7,259,798 B2
(45) Date of Patent: Aug. 21, 2007

(54) IMAGE COMPENSATION APPARATUS

(75) Inventors: Seung Yup Lee, Seongnam-si (KR); Dong Il Han, Seoul (KR); Byung Tae Choi, Anyang-si (KR); Kyoung Hoon Jang, Suwon-si (KR)

(73) Assignee: LG Electronics, Inc., Seoul (KR)

( * ) Notice: Subject to any disclaimer, the term of this patent is extended or adjusted under 35 U.S.C. 154(b) by 508 days.

(21) Appl. No.: 10/852,098

(22) Filed: May 25, 2004

(65) Prior Publication Data
US 2004/0239815 A1  Dec. 2, 2004

(30) Foreign Application Priority Data
May 26, 2003 (KR) .................. 10-2003-0033402

(51) Int. Cl.
*H04N 5/217* (2006.01)
(52) U.S. Cl. ...................... 348/649; 345/430
(58) Field of Classification Search ............... 348/607, 348/624, 655, 674, 671; 345/582, 600
See application file for complete search history.

(56) References Cited

U.S. PATENT DOCUMENTS

| | | | | |
|---|---|---|---|---|
| 5,053,866 A | * | 10/1991 | Johnson | 358/504 |
| 5,057,919 A | * | 10/1991 | de Haan et al. | 348/674 |
| 5,237,402 A | * | 8/1993 | Deshon et al. | 358/520 |
| 5,361,094 A | * | 11/1994 | Jang | 348/254 |
| 5,452,111 A | * | 9/1995 | Giorgianni et al. | 358/504 |
| 5,696,941 A | * | 12/1997 | Jung | 710/3 |
| 6,636,646 B1 | * | 10/2003 | Gindele | 382/274 |
| 6,671,000 B1 | * | 12/2003 | Cloutier | 348/675 |
| 6,707,950 B1 | * | 3/2004 | Burns et al. | 382/254 |
| 6,809,714 B1 | * | 10/2004 | Yamauchi et al. | 345/88 |
| 7,006,065 B1 | * | 2/2006 | Sugawara et al. | 345/89 |
| 7,064,860 B1 | * | 6/2006 | Balasubramanian et al. | 358/1.9 |
| 7,116,354 B2 | * | 10/2006 | Rice et al. | 348/187 |
| 2002/0135743 A1 | * | 9/2002 | Gindele | 355/18 |

* cited by examiner

*Primary Examiner*—Paulos M. Natnael
(74) *Attorney, Agent, or Firm*—Birch, Stewart, Kolasch & Birch LLP

(57) ABSTRACT

The present invention provides an image compensation apparatus, by which a hardware structure is simplified and by which resolution of a remanded color gamut is enhanced when an inputted digital image is compensated to fit the characteristics of a display device. The present invention includes a 3-dimensional look-up table storing 3-dimensional transformation data corresponding to upper n-bits of an input image and a color interpolation unit outputting a final color-transformed image by performing linear interpolation using the 3-dimensional transformation data outputted from the 3-dimensional look-up table and 3-dimensional data corresponding to lower m-bits of the input image.

18 Claims, 9 Drawing Sheets

IMAGE COMPENSATION APPARATUS

This application claims the benefit of the Korean Application No. P2003-0033402 filed on May 26, 2003, which is hereby incorporated by reference.

BACKGROUND OF THE INVENTION

1. Field of the Invention

The present invention relates to an image compensation apparatus by which inputted digital images are compensated to fit characteristics of a display device.

2. Discussion of the Related Art

Generally, digital TV remarkably enhances its image resolution to enable an audience to view images much sharper than those of the previous analog TV. Many developments are made to various high-resolution display devices to represent high-resolution images. And, a large-screen projection TV, PDP TV, projector, and the like stand in the spotlight of display devices of digital TV as well as direct-view type CRT that was previously popular.

Each display device has unique display characteristics. And, Gamma Compensation using three one-dimensional look-up tables, as shown in FIG. 1 is previously used in compensating these characteristics. Such a method is classically known and used worldwide, in which compensation curves are stored for R, G, and B components of an inputted image, respectively to compensate an input-to-output characteristic. Gamma Compensation enables to compensate Gamma characteristic of a display device but is unable to adjust degradation of the color sense caused by various display devices such as CRT, LCD projection TV, PDP, etc. Moreover, Gamma Compensation fails to restore the color sense for an original image prior to photographing via camera.

In order to settle the above problem in FIG. 1, i.e., in order to output the same color of the image photographed via a camera to a display device regardless of various kinds of display devices, a method of storing output RGB values corresponding to input RGB values respectively in a look-up table, as shown in FIG. 2, is proposed. By taking characteristics of a display device into consideration, output values for input combinations for 256-steps R-images, 256-steps G-images, and 256-steps B-images are stored in the look-up table to compensate the characteristics of the display device. In other words, an inputted image is compensated to output using 256×256×256×24-bits look-up table for a predetermined RGB image, whereby an image quality is enhanced or the characteristics of the display device is compensated.

However, such a method is theoretically perfect but has great difficulty in hardware implementation. Namely, about 400 Mbits memory is needed to implement 3-dimensiaonl 256×256×256×24-bits look-up table. Moreover, in ASIC implementation, the look-table itself needs hardware of about a half billion gates, thereby becoming substantially impossible.

SUMMARY OF THE INVENTION

Accordingly, the present invention is directed to an image compensation apparatus that substantially obviates one or more problems due to limitations and disadvantages of the related art.

An object of the present invention is to provide an image compensation apparatus, by which a hardware structure is simplified.

Another object of the present invention is to provide an image compensation apparatus, by which resolution of a remanded color gamut is enhanced when an inputted digital image is compensated to fit the characteristics of a display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image compensation apparatus according to the present invention includes a 3-dimensional look-up table storing 3-dimensional transformation data corresponding to upper n-bits of an input image and a color interpolation unit outputting a final color-transformed image by performing linear interpolation using the 3-dimensional transformation data outputted from the 3-dimensional look-up table and 3-dimensional data corresponding to lower m-bits of the input image.

In this case, the 3-dimensional look-up table outputs 3-dimensional color transformation values corresponding to eight vertexes of a cube, respectively.

And, the color interpolation unit outputs a color transformation value of one point inside a cube by performing the linear interpolation using 3-dimensional color transformation values respectively corresponding to eight vertexes of a cube provided from the 3-dimensional look-up table and a value corresponding to the lower m-bits of the input image.

Moreover, the 3-dimensional look-up table includes an address decoder decoding to output 3-dimentsional data corresponding to the upper n-bits of the input image, a look-up table unit comprising a plurality of look-up tables to output 3-dimensional color transformation values corresponding to outputs of the address decoder, and a data switching unit outputting values of constant positions by varying positions of data outputted from a plurality of the look-up tables according to a control signal of the address decoder, respectively.

In this case, the look-up table unit comprises a plurality of the look-up tables and of a plurality of the look-up tables has an identical memory size. Instead, at least one of a plurality of the look-up tables may have a different memory size. And, the look-up table unit simultaneously outputs the 3-dimensional color transformation values corresponding to eight vertexes of a cube each pixel clock. And, each of the look-up tables outputs one transformation value for a specific 3-dimensional input value.

In another aspect of the present invention, an image compensation apparatus includes a compensation unit compensating each color gamut of an input image to have a different interval, a 3-dimensional look-up table storing 3-dimensional transformation data corresponding to upper n-bits of the input image having the compensated color gamut, a color interpolation unit outputting a final color-transformed image by performing linear interpolation using the 3-dimensional transformation data outputted from the 3-dimensional look-up table and 3-dimensional data corresponding to lower m-bits of the compensated input image, and a reverse-compensation unit reversely compensating the color gamut of the image outputted from the color interpolation unit to have an equal interval.

In this case, the compensation unit includes a 1-dimensional look-up table compensating color gamuts of inputted R, G, and B to have different intervals, respectively. And, the reverse-compensation unit includes a 1-dimensional look-up table performing reverse-compensation on each of R, G, and B according to a process reverse to that of the compensating unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, the present invention relates to a transformation method using a reduced 3-dimensional look-up table in adjusting colors of input and output images. Namely, the present invention utilizes a 65×65×65-bits or 33×33×33-bits reduced 3-dimensional look-up table or the like instead of the previous 256×256×256-bits 3-dimensaional look-up table.

Hence, the present invention handles upper bits of an inputted image with the reduced 3-dimentsional look-up table and linearly interpolates the rest lower bits via a color interpolation unit, thereby resulting in a value almost similar to a result of using the 256×256×256-bits look-up table. Therefore, the present invention remarkably reduces hardware.

Figure 1:
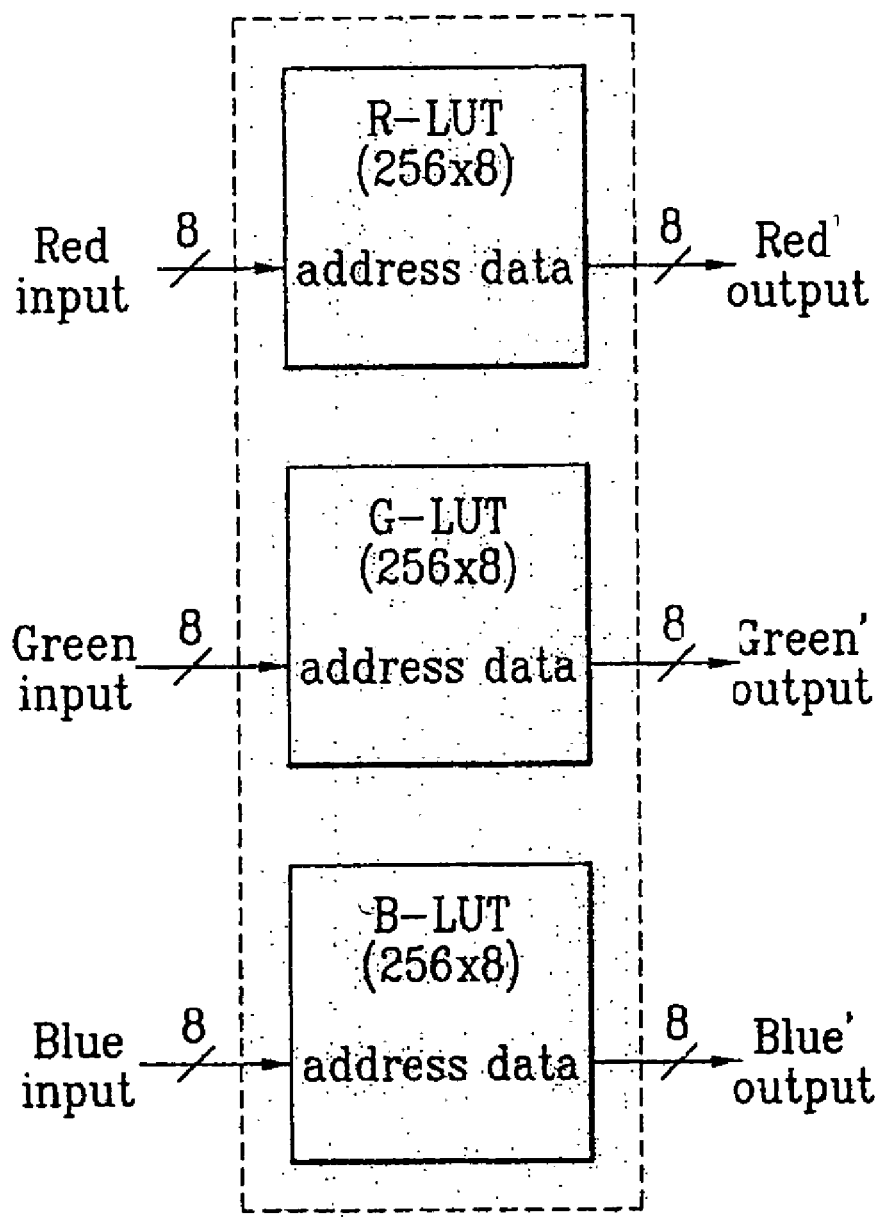
FIG. 1 and FIG. 2 are diagrams of image compensation devices according to a related art, respectively.
Figure 2:
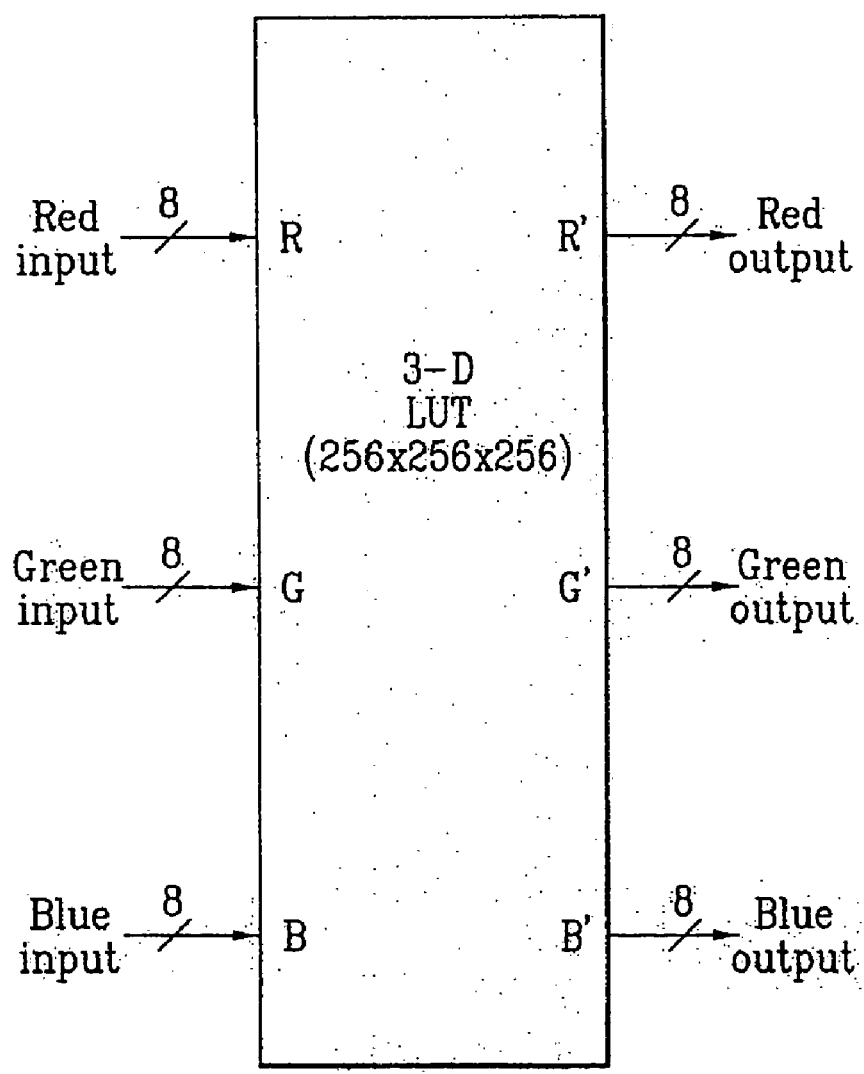
Figure 3:
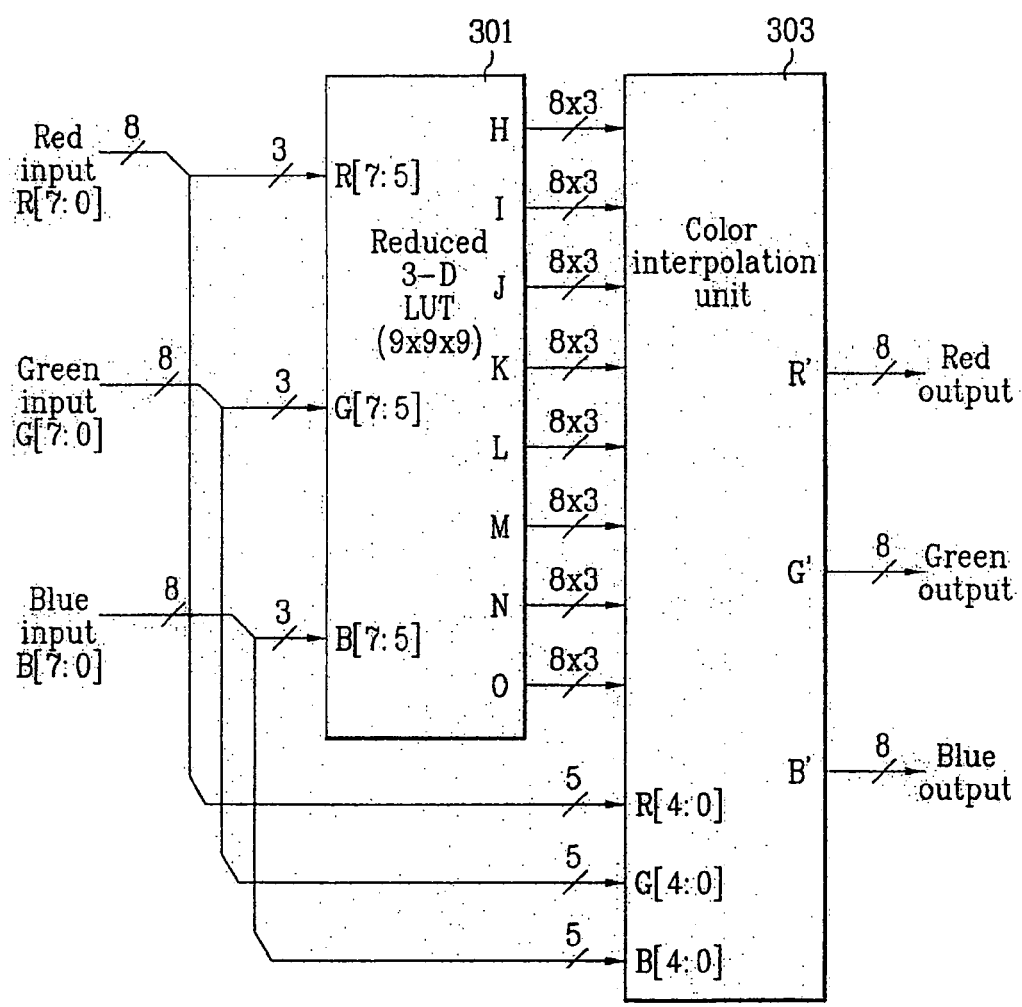
FIG. 3 is a block diagram of an image compensation apparatus according to one embodiment of the present invention.

FIG. 3 is a block diagram of an image compensation apparatus according to one embodiment of the present invention.

Referring to FIG. 3, a 9×9×9×24-bits look-up table 301 is used for each upper 3-bits of 8-bits R/G/B signals of an input image and linear interpolation is performed on lower 5-bits in a color interpolation unit 303 to output a new image. Hence, the present invention enables to compensate an image quality to fit characteristics of a display device and to reduce about 17,496 bits of the look-up table. Namely, an image compensation apparatus according to one embodiment of the present invention includes a 3-dimensional look-up table 301 storing 3-dimensional transformation data for each upper 3-bits part of an R/G/B/ or Y/Cb/Cr image or the like and a color interpolation unit 303 performing linear interpolation using each lower 5-bits part of the input image and an output of the 3-dimensional look-up table 301 to output a color-transformed image finally.

In this case, the look-up table 301 is 3-dimensionally configured to provide a function of enhancing image quality much better than that provided by the previous 1-dimensional look-up table. Moreover, the look-up table 301 is utilized together with the color interpolation unit 303 to provide complexity similar to that of the 1-dimensional look-up table.

Meanwhile, the upper 3-bits and lower 5-bits are exemplary only in this description. The number of bits inputted to the look-up table and the color interpolation unit can be variously and widely varied. Hence, a scope of the bit numbers is not limited to this embodiment of the present invention.

Figure 4:
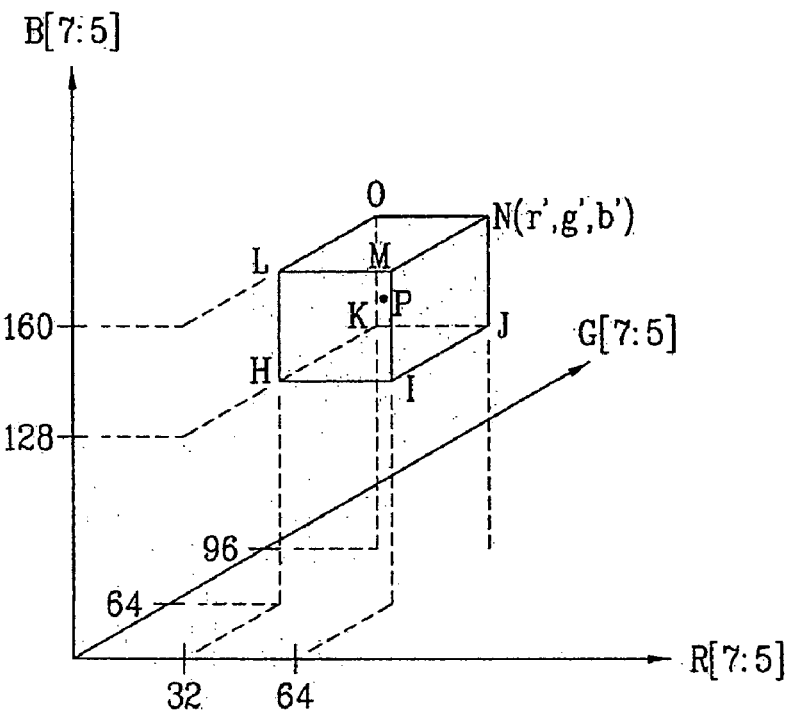
FIG. 4 is a graphical diagram of exemplary coordinates of R, G, and B transformation values stored in a 3-dimensional look-up table of FIG. 3.

In case of configuring the 3-dimensional look-up table 301, as shown in FIG. 3, using information of the upper 3-bits, transformation values for coordinate values of 0, 32, 64, 96, 128, 160, 192, 224, and 26 of respective R, G, and B components, as shown in FIG. 4, can be stored in the 3-dimensional look-up table 301. Namely, the transformation values for the coordinate values 0, 32, 64, 96, 128, 160, 192, 224, and 26 of the respective R, G, and B components are stored in the 3-dimensional look-up table 301 only. Hence, if a separate value (e.g., 165 coordinate value) except the transformation values stored in the look-up table 301 is inputted to the look-up table 310, the look-up table 301 is unable to transform the inputted value accurately. Hence, the color interpolation unit 303, as shown in FIG. 3, performs linear interpolation on the separate value (e.g., 165 coordinate value) except the transformation values stored in the look-up table 301 using output values of the look-up table 301 and the lower bits failing to be inputted to the look-up table 301, thereby providing an accurately transformed value.

Figure 5:
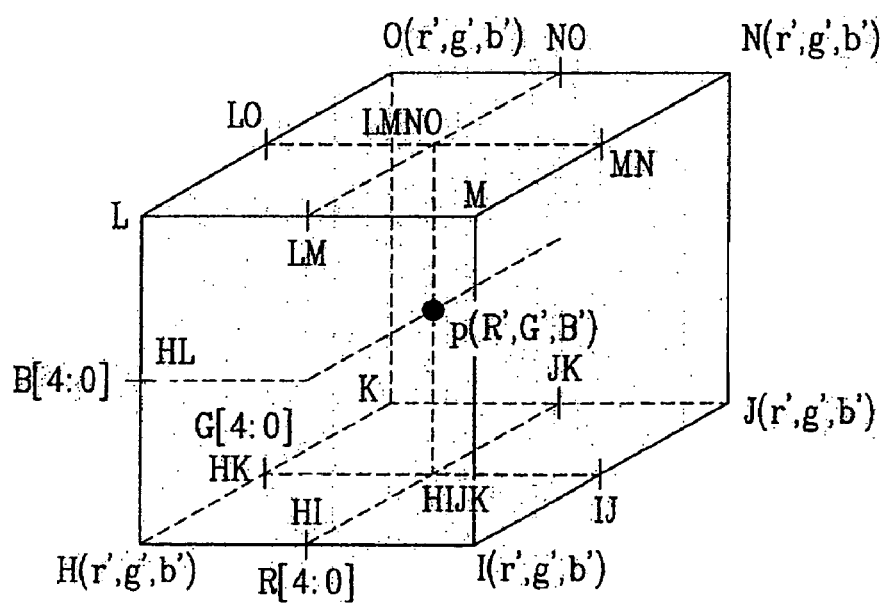
FIG. 5 is a diagram for explaining interpolation of a color interpolation unit in FIG. 3.

In doing so, the look-up table 301 should provide a transformation value of each vertex of a cube so that 3-dimensional data is interpolated by the color interpolation unit 303. The transformation values of the vertexes, as shown in FIGS. 3 to 5, are denoted by points H, I, J, K, L, M, N, and O, respectively.

Namely, the 3-dimentsional look-up table 301 provides color transformation values corresponding to 8-vertexes of the cube to the color interpolation unit 303. And, the color interpolation unit 303 is facilitated to compute a final color transformation value using the input value and the color transformation values of the look-up table.

For instance, if (R,G,B) of a current input image is (46,80,150), i.e., if R, G, and B values are 46, 80, and 150, respectively, the 3-dimensional look-up table 301 provides R, G, and B color transformation values at positions of H=(32, 64, 128), I=(64, 64, 128), J=(64, 96, 128), K=(32, 96, 128), L=(32, 64, 160), M=(64, 64, 160), N=(64, 96, 160), and O=(32, 96, 160). Namely, each of the vertexes H, I, J, K, L, M, N, and O stores new transformation values for the respective R, G, and B components, and the color interpolation unit 303 utilizes the new transformation values.

For example, if transformation values for R=32, G=64, and G=128 are 42, 74, and 138, respectively, the 3-dimensional look-up table 301 outputs H=(42,74,138) as the transformation value corresponding to H=(32,64,128) to the color interpolation unit 303.

By linear interpolation using transformation value information for 8-vertexes of the cube provided from the 3-dimensional look-up table 301 and the lower 5-bits parts of the input image, the color interpolation unit 303 computes transformation values for the substantially inputted R, G, and B values, i.e., color transformation values of one point inside the cube, which is shown in detail in FIG. 5.

Referring to FIG. 5, each of 8-vertexes H, I, J, K, L, M, N, and O has 8-bits transformation values for R, G, and B values, respectively. And, the transformed values of the 8-vertexes are outputted from the look-up table 301 to the color interpolation unit 303. And, the color interpolation unit 303 computes a final transformation value using the transformation values for the 8-vertexes and lower 5-bits information of R, G, and B components of an inputted image. Namely, a transformation value of a position HI is computed using values of H, I, and R[4:0], and a transformation value of a position JK is computed using values of K, J, and R[4:0]. And, a transformation value of a position HIJK can be computed using the transformation values of the positions HI and JK and a value of G[4:0]. In the same manner, a transformation value of a final point p can be computed using the values of the 8-vertexes and values of R[4:0], G[4:0], and B[4:0].

Meanwhile, the transformation value at the point p can be sequentially calculated in the above-explained manner. Yet, in case that an operational speed is slow, it can be calculated by one rule using the values at the 8-vertexes and three lower 5-bits values of R, G, and B. In doing so, the color interpolation unit (303) can be implemented by constructing an interpolator in various ways according to a maximum operational speed.

In this case, R, G, and B image inputs inputted to the 3-dimensional look-up table 301 and the color interpolation unit 503 are inputted by pixel clock unit and image data can be changed each clock. Hence, a transformation result should be outputted by the pixel clock unit. For this, information of the 8-vertexes should be simultaneously outputted from the 3-dimensional look-up table 301 each clock.

Figure 7:
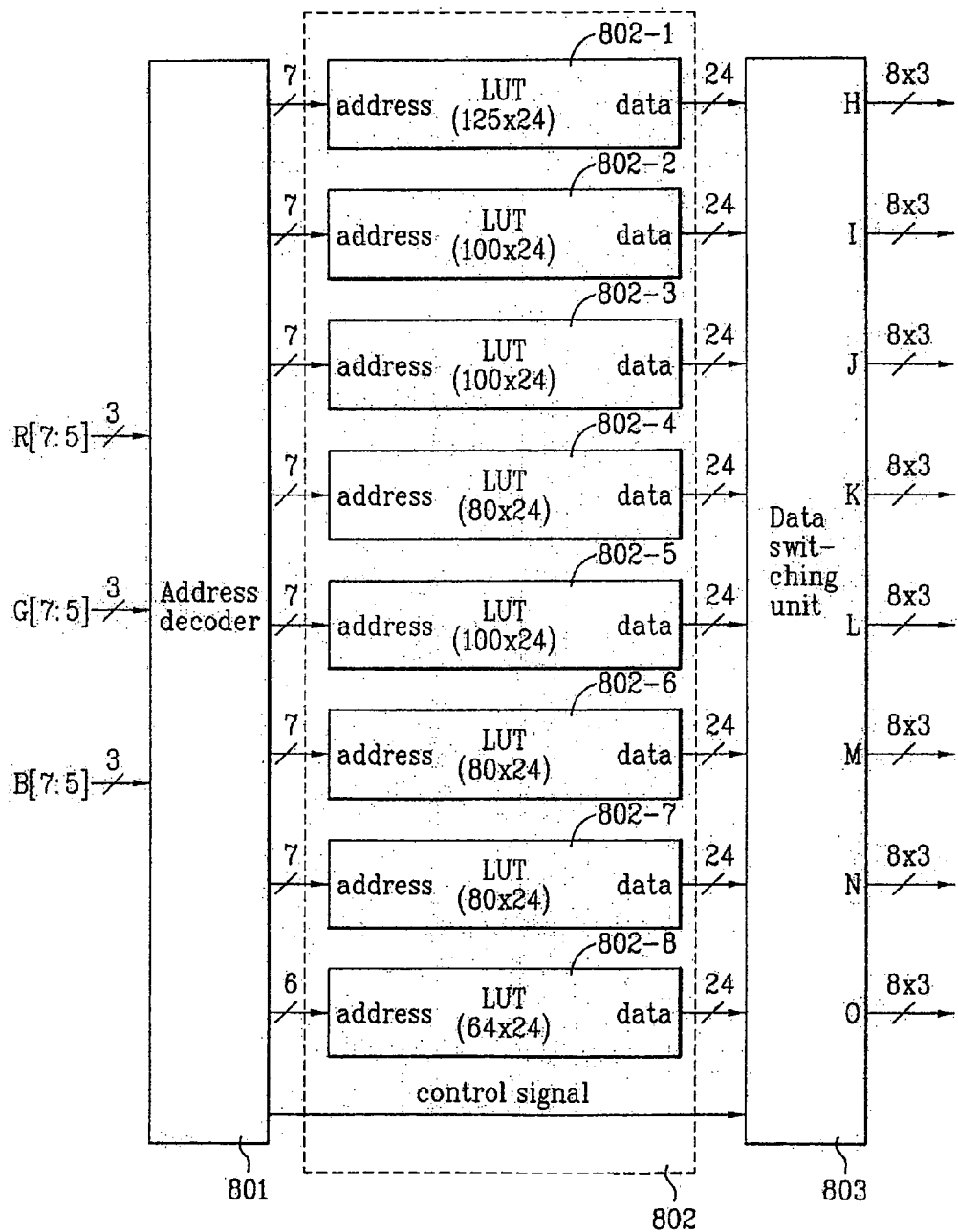
FIG. 7 is a detailed block diagram of the 3-dimensional look-up table in FIG. 3.

FIG. 7 is a block diagram of an inner structure of a 3-dimensional look-up table enabling the above operation.

Referring to FIG. 7, a look-up table 802 is separated into at least eight look-up tables 802-1 to 802-8 to provide 8-vertexes information simultaneously. The look-up tables 802-1 to 802-8 store position values failing to be adjacent to each other in 9×9×9-3-dimensional look-up table, and is configured to need one output value from one look-up table for specific an R/G/B input value. Moreover, each of the look-up tables can be constructed with a memory of the same size or at least one of the look-up tables may differ in size.

For instance, the look-up table 802-1 of 125×24 size at the top stores R, G, and B values of (0,0,0), (64,0,0), (128,0,0), (192,0,0), (256,0,0), (0,64,0), (64,64,0), (128,64,0), (192,64, 0), (256,64,0), etc.

Namely, the look-up table 802-1 stores total one hundred twenty-five transformation data including five R-components, five G-components, five-B components, and the like and can be implemented using a 125×24 memory. The rest look-up tables can be implemented in the same manner or can be separated into eight memories as well. Preferably, the present invention enables to implement the 9×9×9-size 3-dimensional look-up table using at least eight look-up tables.

The 3-dimentional look-up table can be implemented by hardware with ease so that an address decode 8-1 appropriately provides address values. Namely, the address decoder 801 decodes values (e.g., upper 3-bits) corresponding to MSB of R, G, and B to provide to the look-up table 802.

And, each of the eight look-up tables 802-1 to 802-8 stores 8-bits of R, G, and B for the respective values and simultaneously outputs the respective values.

A data switching unit 803 changes a position of the look-up table data inputted using a control signal provided from the address decoder 801, thereby providing constant values of the positions H, I, J, K, L, M, N, and O to the color interpolation unit 303.

For instance, if the transformed R, G, and B values for the point H are stored in the fourth look-up table 802-4, an H-output end of the data switching unit 803 is switched to the fourth look-up table 802-4 to output the transformed R, G, and B values for the point H.

Hence, the color interpolation unit just needs to perform simple interpolation on the eight points without considering position variation, thereby facilitating calculation and overall hardware design.

Figure 6:
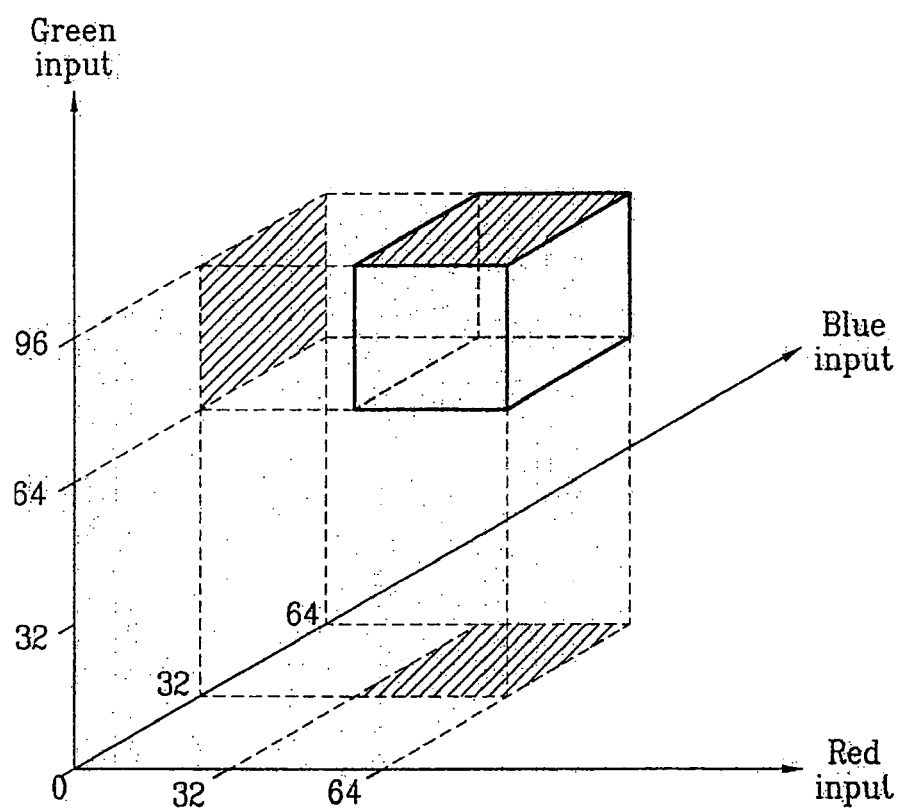
FIG. 6 is a graphical diagram of another exemplary coordinates of R, G, and B transformation values stored in a 3-dimensional look-up table of FIG. 3.

FIGS. 4 to 6 show examples on coordinate axes that transformation values for R, G, and B are stored in a 3-dimensional look-up table when each color gamut of R, G, and B has an equal interval in case of implementing the 3-dimensional look-up table using information of upper 3-bits.

Referring to FIG. 4, an interval, i.e., color gamut, between coordinate values stored in a look-up table for R, G, and B each is equal to each other. For instance, intervals (color gamut) between 0, 32, 64, 96, 128, 160, 192, 224, and 256 are equal to each other in distance. This means that resolution of each color gamut is identical since every color gamut is identically interpolated.

For instance, the human sense of sight is insensitive to dark portions of a plurality of color gamuts having less color change but is sensitive to bright portions of the color gamuts having more color change. Yet, resolution of the color gamut is identical regardless of darkness or brightness since every color gamut has the same size.

Hence, another embodiment of the present invention ≠ be implemented in a manner that resolution is raised by performing finite interpolation on specific color gamut having a reduced interval or is lowered by performing rough interpolation on another specific color gamut having an increased interval.

Figure 8:
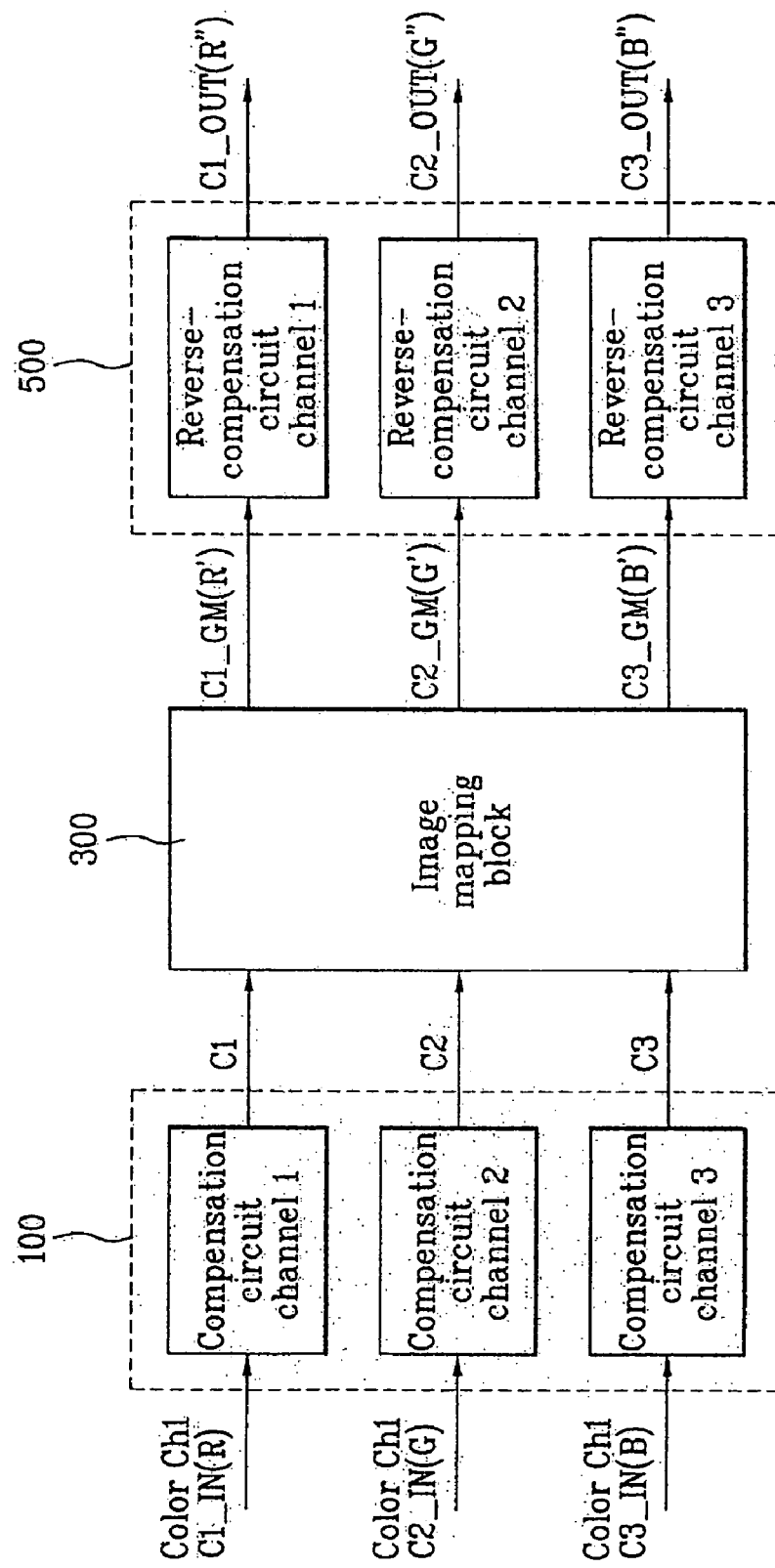
FIG. 8 is a block diagram of an image compensation apparatus according to another embodiment of the present invention.

FIG. 8 is a block diagram of an image compensation apparatus according to another embodiment of the present invention.

Referring to FIG. 8, three compensation units 100 compensating a size of each color gamut for R, G, and B, respectively are added to a front end of an image mapping block 300, three reverse-compensation units 500 performing reverse processes of the three compensation units 100 for the R, G, and B, respectively are added to a rear end of the image mapping block 300.

The image mapping block 300 can be implemented with the same construction in FIG. 3 for example.

In doing so, every color gamut of R, G, and B can be identically and non-linearly interpolated or the R, G, and B can be interpolated differently and non-linearly.

Figure 9A:
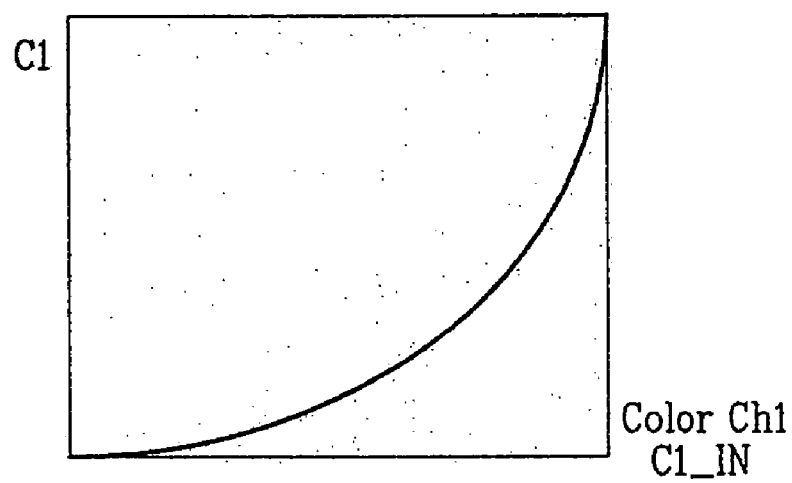
FIG. 9A and FIG. 9B are exemplary graphs of compensation/reverse-compensation if compensation and reverse-compensation units of FIG. 8.
Figure 9B:
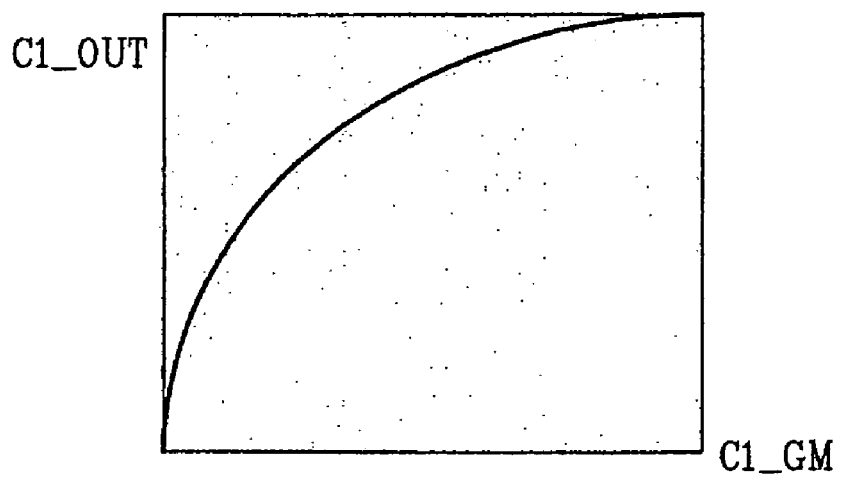

FIG. 9A shows an example of color gamut compensation of the compensation unit 100, and FIG. 9B shows an example of color gamut reverse-compensation of the reverse-compensation unit 500.

Namely, coordinate value of an inputted color signal, as shown in FIG. 9A, is non-linearly interpolated to differentiate a size of color gamut. And, coordinates of an outputted color signal, as shown in FIG. 9B, are compensated by the image mapping block 300 in a process reverse to that in FIG. 9A. In doing so, the compensation unit 100 and the reverse-compensation unit 500 can be implemented by 1-dimensional look-up tables, respectively.

And, a size of a cube found by R, G, and B coordinates vary in size in accordance with a compensation method of the compensation units 100.

Figure 10:
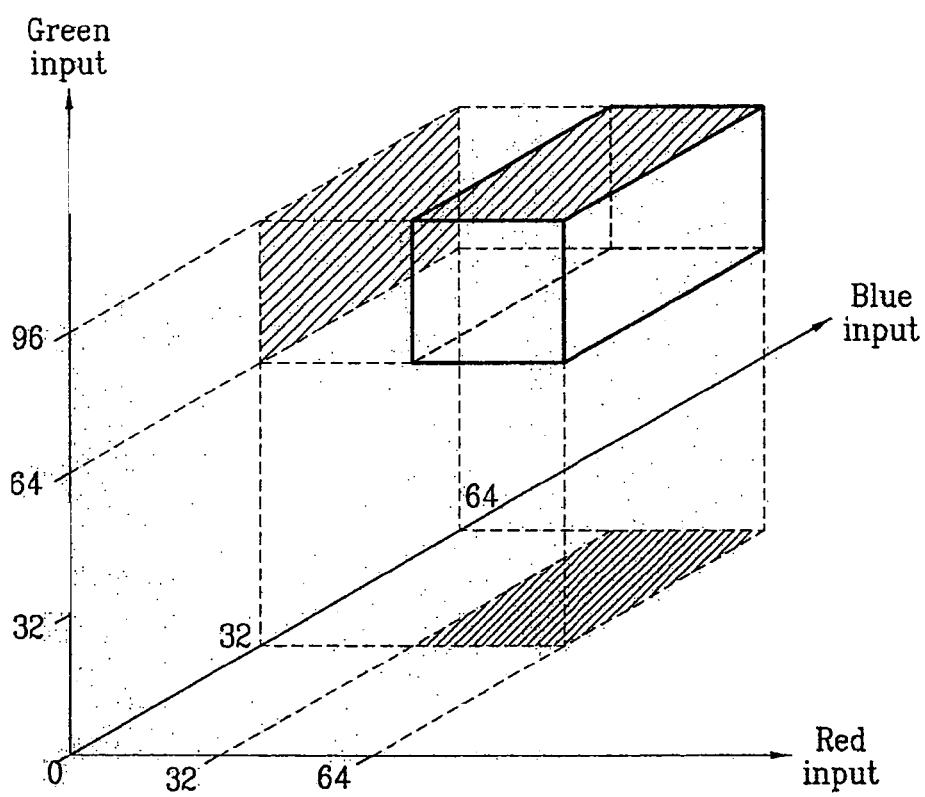
FIG. 10 is a graphical diagram of another further exemplary coordinates of R, G, and B transformation values stored in a 3-dimensional look-up table of FIG. 3.

FIG. 6 shows an example of a size of a cube according to coordinates in case of equal interval of color gamut, and FIG. 10 shows an example of a size of a cube according to coordinates in case of unequal interval of color gamut For instance, if (R,G,B) of a current input image is (46,80,50), i.e., if R, G, And B values are 46, 80, and 50, respectively, a regular hexahedron appears since intervals of the color gamut of the R, G, and B in FIG. 6 are equal to each other. Yet, assuming that the R, G, and B are compensated into the color gamut of FIG. 10 by the compensation units 100 of FIG. 8, respectively, a rectangular parallelepiped appears.

The 3-dimensional look-up table 301 of the image mapping block 300 outputs transformation values for the respective vertexes of the rectangular parallelepiped in FIG. 3 to the color interpolation unit 303. The color interpolation unit 303 then computes the transformation values for the substantially inputted R, G, and B values, i.e., a color transformation value of one point inside the rectangular parallelepiped by linear interpolation using the transformation value information for the 8-vertexes of the parallelepiped of FIG. 10 and lower 5-bits parts of the input image.

An interpolation value outputted from the color interpolation unit 303 passes through a reverse process of the compensation unit 100 via the reverse-compensation unit 500 to be compensated into an original form and is then outputted finally.

Thus, the present invention arbitrarily adjusts to enhance resolution of the demanded color gamut.

Namely, the present invention enables to display a specific color gamut more finely.

Meanwhile, the present invention is applicable to various coordinate systems as well as the RGB color coordinate system.

Accordingly, an image compensation apparatus according to the present invention has the following advantages or effects.

First of all, the 3-dimensional look-up table is constructed using upper bits of an input image and interpolation is performed using lower bits of the input image and outputs of the 3-dimensional look-up table, whereby color coinciding with the input image can be outputted regardless of characteristics of a display device and an amount of hardware needed to implement the image compensation apparatus can be remarkably reduced.

And, the compensation device for compensating the interval of color gamut and the reverse-compensation device are added to front and rear ends of the image mapping block, respectively, thereby enabling to enhance resolution of the demanded color gamut.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An image compensation apparatus comprising:
    a 3-dimensional look-up table storing 3-dimensional transformation data corresponding to upper n-bits of an input image; and
    a color interpolation unit outputting a final color-transformed image by performing linear interpolation using the 3-dimensional transformation data outputted from the 3-dimensional look-up table and 3-dimensional data corresponding to lower m-bits of the input image,
    wherein the color interpolation unit outputs a color transformation value of one point inside a cube by performing the linear interpolation using 3-dimensional color transformation values respectively corresponding to eight vertexes of a cube provided from the 3-dimensional look-up table and a value corresponding to the lower m-bits of the input image,
    wherein the 3-dimensional color transformation values are selected from a set of all possible 3-dimensional color transformation values for defining the input image comprising the upper and lower bits, and
    wherein the 3-dimensional look-up table stores a reduced number of the 3-dimensional color transformation values for defining the input image comprising the upper and lower bits.

2. The image compensation apparatus of claim 1, wherein the upper n-bits and the lower rn-bits of the input image are 3-bits and 5-bits, respectively.

3. An image compensation apparatus comprising:
    a 3-dimensional look-up table storing 3-dimensional transformation data corresponding to upper n-bits of an input image; and
    a color interpolation unit outputting a final color-transformed image by performing linear interpolation using the 3-dimensional transformation data outputted from the 3-dimensional look-up table and 3-dimensional data corresponding to lower m-bits of the input image,
    wherein the 3-dimensional look-up table comprises:
    an address decoder decoding to output 3-dimentsional data corresponding to the upper n-bits of the input image;
    a look-up table unit comprising a plurality of look-up tables to output 3-dimensional color transformation values corresponding to outputs of the address decoder; and
    a data switching unit outputting values of constant positions by varying positions of data outputted from a plurality of the look-up tables according to a control signal of the address decoder, respectively.

4. The image compensation apparatus of claim 3, wherein the look-up table unit comprises a plurality of the look-up tables and wherein each of a plurality of the look-up tables has an identical memory size.

5. The image compensation apparatus of claim 3, wherein the look-up table unit comprises a plurality of the look-up tables, and
   wherein at least one of a plurality of the look-up tables has a different memory size.

6. The image compensation apparatus of claim 3, wherein the look-up table unit simultaneously outputs the 3-dimensional color transformation values corresponding to eight vertexes of a cube each pixel clock.

7. The image compensation apparatus of claim 3, wherein the look-up table unit comprises a plurality of the look-up tables and each of the look-up tables outputs one transformation value for a specific 3-dimensional input value.

8. An image compensation apparatus comprising:
   a 3-dimensional look-up table storing 3-dimensional transformation data corresponding to upper n-bits of an input image;
   a color interpolation unit outputting a final color-transformed image by performing linear interpolation using the 3-dimensional transformation data outputted from the 3-dimensional look-up table and 3-dimensional data corresponding to lower m-bits of the input image; and a compensation unit compensating each color gamut of the input image to have a different interval to output to the 3-dimensional look-up table.

9. The image compensation apparatus of claim 8, wherein the compensation unit comprises a 1-dimensional look-up table compensating color gamuts of inputted R, G, and B to have different intervals, respectively.

10. An image compensation apparatus comprising:
    a 3-dimensional look-up table storing 3-dimensional transformation data corresponding to upper n-bits of an input image;
    a color interpolation unit outputting a final color-transformed image by performing linear interpolation using the 3-dimensional transformation data outputted from the 3-dimensional look-up table and 3-dimensional data corresponding to lower m-bits of the input image; and
    a reverse-compensation unit reversely compensating color gamut of the image outputted from the color interpolation unit to have an equal interval.

11. The image compensation apparatus of claim 10, wherein the reverse compensation unit comprises a 1-dimensional look-up table performing reverse-compensation on each of R, G, and B according to a process reverse to that of the compensating unit.

12. An image compensation apparatus comprising:
    a compensation unit compensating each color gamut of an input image to have a different interval;
    a 3-dimensional look-up table storing 3-dimensional transformation data corresponding to upper n-bits of the input image having the compensated color gamut;
    a color interpolation unit outputting a final color-transformed image by performing linear interpolation using the 3-dimensional transformation data outputted from the 3-dimensional look-up table and 3-dimensional data corresponding to lower m-bits of the compensated input image; and
    a reverse-compensation unit reversely compensating the color gamut of the image outputted from the color interpolation unit to have an equal interval.

13. The image compensation apparatus of claim 12, wherein the compensation unit comprises a 1-dimensional look-up table compensating color gamuts of inputted R, G, and B to have different intervals, respectively.

14. The image compensation apparatus of claim 12, wherein the 3-dimensional look-up table outputs 3-dimensional color transformation values corresponding to eight vertexes of a cube.

15. The image compensation apparatus of claim 12, wherein the color interpolation unit outputs a color transformation value of one point inside a cube by performing the linear interpolation using a 3-dimensional color transformation value corresponding to eight vertexes of a cube provided from the 3-dimensional look-up table and a value corresponding to the lower m-bits of the input image.

16. The image compensation apparatus of claim 12, wherein the upper n-bits and the lower m-bits of the input image are 3-bits and 5-bits, respectively.

17. The image compensation apparatus of claim 12, wherein the 3-dimensional look-up table comprises:
    an address decoder decoding to output 3-dimentsional data corresponding to the upper n-bits of the input image;
    a look-up table unit comprising a plurality of look-up tables, the look-up table unit simultaneously outputting 3-dimensional color transformation values corresponding to eight vertexes of a cube each pixel clock; and
    a data switching unit outputting values of constant positions by varying positions of data outputted from a plurality of the look-up tables according to a control signal of the address decoder, respectively.

18. The image compensation apparatus of claim 12, wherein the reverse-compensation unit comprises a 1-dimensional look-up table performing reverse-compensation on each of R, G, and B according to a process reverse to that of the compensating unit.

* * * * *